US008112043B2

(12) United States Patent
Knudsen et al.

(10) Patent No.: US 8,112,043 B2
(45) Date of Patent: Feb. 7, 2012

(54) RADIO FREQUENCY COMMUNICATION DEVICES AND METHODS

(75) Inventors: Mikael Bergholz Knudsen, Gistrup (DK); Peter Bundgaard, Aalborg (DK); Jan-Erik Mueller, Ottobrunn (DE)

(73) Assignee: Infineon Technologies AG, Neubiberg (DE)

( * ) Notice: Subject to any disclaimer, the term of this patent is extended or adjusted under 35 U.S.C. 154(b) by 969 days.

(21) Appl. No.: 12/101,616

(22) Filed: Apr. 11, 2008

(65) Prior Publication Data

US 2009/0256644 A1 Oct. 15, 2009

(51) Int. Cl.
*H04B 17/00* (2006.01)

(52) U.S. Cl. .................. 455/67.14; 455/423; 455/67.11; 455/69; 455/115.2; 455/193.2; 455/226.1; 379/27.03; 379/27.06; 379/264

(58) Field of Classification Search ............... 455/67.14, 455/423–424, 115.1, 115.2, 193.2, 193.3, 455/186.1, 226.1, 67.11, 69; 333/32; 379/27.06, 379/24

See application file for complete search history.

(56) References Cited

U.S. PATENT DOCUMENTS

| | | | | |
|---|---|---|---|---|
| 5,059,892 | A * | 10/1991 | Stoft | 324/73.1 |
| 5,459,440 | A * | 10/1995 | Claridge et al. | 333/17.3 |
| 5,525,971 | A * | 6/1996 | Flynn | 714/724 |
| 5,548,222 | A * | 8/1996 | Jensen et al. | 324/628 |
| 5,548,821 | A * | 8/1996 | Coveley | 455/67.14 |
| 5,889,837 | A * | 3/1999 | Sands | 379/27.06 |
| 5,996,102 | A * | 11/1999 | Haulin | 714/740 |
| 7,596,356 | B2 * | 9/2009 | Rofougaran et al. | 455/73 |
| 7,865,154 | B2 * | 1/2011 | Mendolia et al. | 455/125 |
| 7,899,410 | B2 * | 3/2011 | Rakshani et al. | 455/78 |

* cited by examiner

*Primary Examiner* — Marceau Milord

(74) *Attorney, Agent, or Firm* — Eschweiler & Associates, LLC

(57) ABSTRACT

One embodiment relates to a radio frequency (RF) communication device. The RF communication device includes an antenna interface coupled to an antenna that exhibits a time-varying impedance. The RF communication device also includes a test interface coupled to RF test equipment that exhibits a test impedance. A tuning circuit in the RF communications device selectively provides a matched impedance to either the time-varying impedance or the test impedance based on feedback derived from the test interface. Other methods and systems are also disclosed.

25 Claims, 5 Drawing Sheets

RADIO FREQUENCY COMMUNICATION DEVICES AND METHODS

FIELD OF INVENTION

The present invention relates generally to methods and systems related to radio frequency (RF) communication devices.

BACKGROUND OF THE INVENTION

Whenever a source of power, such as a radio transmitter, delivers power to a load, the power is delivered most efficiently when the impedance of the load is equal to the complex conjugate of the impedance of the source. For two impedances to be complex conjugates, their resistances are equal, and their reactances are equal in magnitude but of opposite signs. Adjusting the source impedance or the load impedance, in general, is called "impedance matching."

Impedance matching is the practice of attempting to make the output impedance of a source equal to the input impedance of the load to which it is ultimately connected, usually in order to maximize the power transfer and minimize reflections from the load. Impedance matching is particularly important in RF communications devices.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

One embodiment relates to a radio frequency (RF) communication device. The RF communication device includes an antenna interface coupled to an antenna that exhibits a time-varying impedance. The RF communication device also includes a test interface coupled to RF test equipment that exhibits a test impedance. A tuning circuit in the RF communications device selectively provides a matched impedance to either the time-varying impedance or the test impedance based on feedback derived from the test interface.

The following description and annexed drawings set forth in detail certain illustrative aspects and implementations of the invention. These are indicative of only a few of the various ways in which the principles of the invention may be employed.

DETAILED DESCRIPTION OF THE INVENTION

Figure 1:
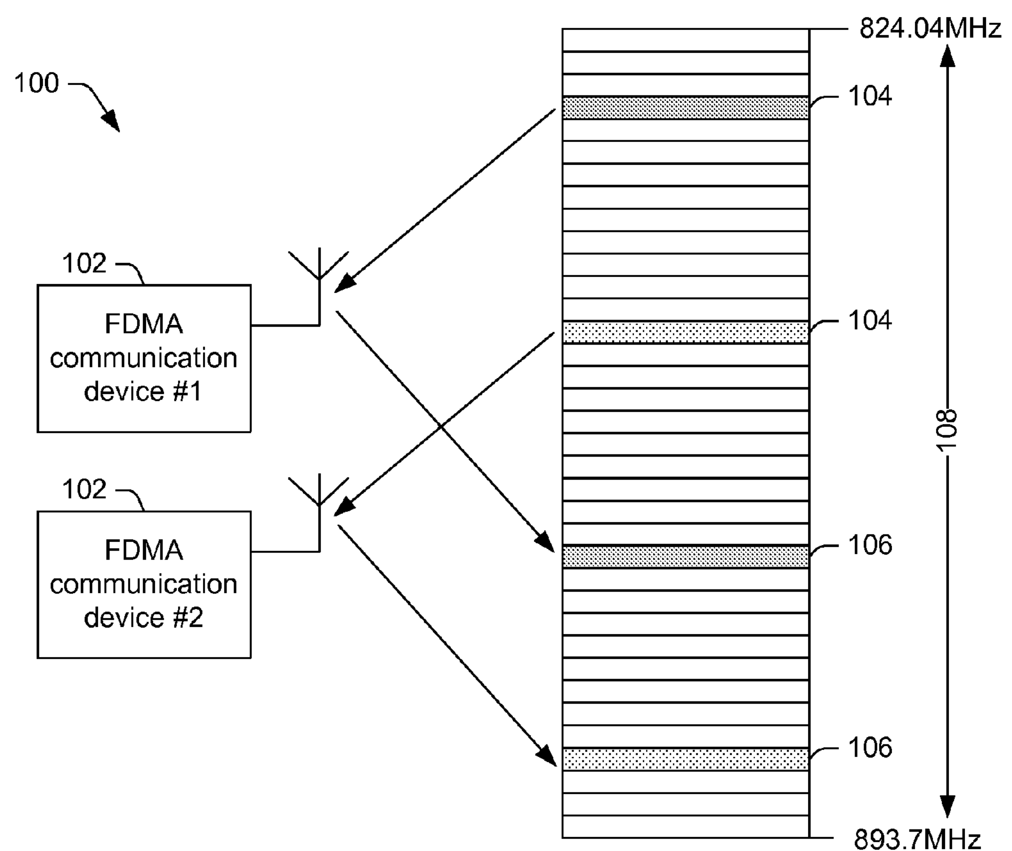
FIG. 1 shows a frequency division multiple access (FDMA) technology in which several FMDA radio frequency (RF) communication devices communicate.

One or more implementations of the present invention will now be described with reference to the attached drawings, wherein like reference numerals are used to refer to like elements throughout.

In various embodiments described below, a radio frequency (RF) communication device includes a test switch that allows the communication device to selectively communicate data via an antenna interface or a test interface. In operational mode, the test switch is in a first position so the communication device transmits and/or receives data through the antenna interface over an antenna. In test mode, the test switch is in a second position so the communication device transmits and/or receives data through the test interface to or from standard RF test equipment. In various embodiments, the RF communication device is a mobile phone handset using frequency division multiple access (FDMA), time division multiple access (TDMA), or code-division multiple access (CDMA) technology.

FIG. 1 depicts a frequency domain multiple access (FDMA) access method 100 capable of communicating with multiple FDMA communication devices 102, such as mobile phones. During operation, each FMDA communication device 102 requests access to the network. If the network accepts the request, the network then assigns the FMDA communication device 102 its own unique transmit frequency band 104 and/or its own unique receive frequency band 106, both of which fall within an available frequency band 108 used for communication. The FDMA communication device 102 can then transmit and/or receive data on its assigned frequency bands for the duration of its communication. In this way, FMDA access methods allow multiple FDMA communications devices 102 to communicate simultaneously without adversely interfering with one another.

Figure 2:
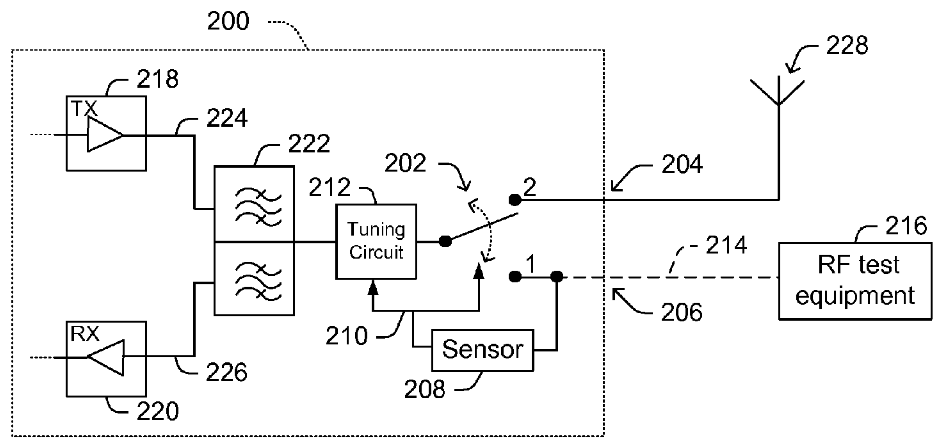
FIG. 2 shows one embodiment of a FDMA RF communication device in accordance with some aspects of the present invention.

FIG. 2 depicts a more detailed embodiment of a FDMA communication device 200 adapted to use FDMA techniques in accordance with some aspects of the present invention. The FDMA communication device 200 includes a test switch 202 that allows the communication device to selectively communicate via an antenna interface 204 or a test interface 206. To facilitate this functionality, a sensor 208 monitors the test interface 206 and provides feedback along a feedback path 210 to a tuning circuit 212 and the test switch 202.

In one embodiment, the feedback relates to whether the sensor 208 detects a test cable 214 in the test interface 206. If so, the tuning circuit 212 sets its impedance to an impedance expected for RF test equipment 216. In some embodiments, this impedance is approximately 50 ohms, which is standard for RF test equipment. After the tuning circuit 212 has set its impedance to match that of the RF test equipment 216, the test switch 202 moves to position "1". This allows the RF test equipment 216 to monitor signals and perform tests on the FDMA communications device 200 through the test interface 206.

While the test switch 202 is in position "1", the RF test equipment 216 can perform tests on a transmitter 218 and a receiver 220 within the FDMA communication device 200. Because the transmitter 218 often has a low-impedance and the receiver 220 often has a high-impedance, a test interface 206 of about 50 ohms represents a compromise of sorts in that it is not necessarily precisely matched for either the transmitter 218 or receiver 220. However, because the test interface 206 of approximately 50 ohms is matched to the RF test equipment 216, reflections will be limited somewhat between the RF test equipment 216 and transmitter 218 and receiver 220. To test the transmitter 218, a filter 222 passes signals at a unique transmit frequency band that could be assigned to the FDMA communication device 200. The transmitter 218 then generates transmission test signals. The transmission test signals are passed along a transmission path 224, through the filter 222, and through the tuning circuit 212, before passing through the test switch 202 and test interface 206 to the RF test equipment 216. To test the receiver 220, the filter 222 passes signals at a unique receive frequency band that could be assigned to the FDMA communication device 200. The RF test equipment 216 then generates reception test signals. These reception test signals pass from the test interface 206 and through the tuning circuit 212, before passing along a reception path 226 to the receiver 220. In this way, tests can be carried out when the test cable 214 is detected.

If, however the sensor 208 does not detect the test cable 214, the test switch 202 is moved to position "2" and the communication device transmits or receives using FDMA techniques. During this operational mode, the tuning circuit 212 continuously or intermittently adjusts its impedance to match a time-varying impedance of the antenna 228. Thus, the tuning circuit 212 may adjust its impedance to account for impedance variations between the transmitter 218 and receiver 220, impedance variations due to change in frequency channels on which data is transmitted or received, or even impedance variations due to the manner in which a user holds the communication device. For example, if the user touches the antenna 228 or moves the antenna 228 closer to his or her body, the impedance of the antenna 228 will tend to change and the tuning circuit 212 can adjust its impedance accordingly. In this manner, the tuning circuit 212 can provide a time-varying impedance that matches a time-varying impedance experienced by the antenna 228 while FDMA techniques are in use. This limits reflections and allows for extremely efficiently power transfer between the antenna 228 and transmitter 218 and receiver 220, thereby improving the functionality of the FDMA communication device 200.

In one embodiment, the test switch 202 is a mechanical switch, but in other embodiments the test switch 202 could be an electrical switch, such as a transistor, multiplexer, or vacuum tube. Mechanical switches may be particularly useful in that they are often relatively cheap and have low insertion loss. The test switch 202 could also be a micro-electrical-mechanical system (MEMs) switch, electro-mechanical switch, or some other switch.

Figure 3:
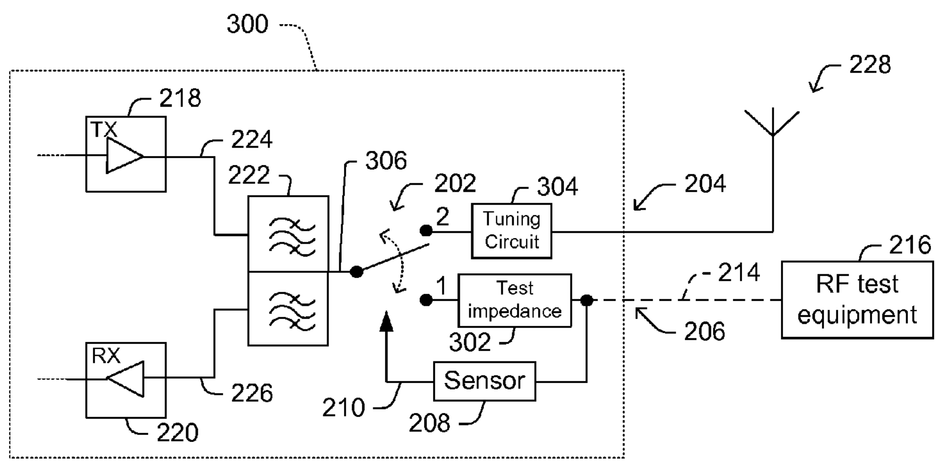
FIG. 3 shows another embodiment of a FDMA RF communication device in accordance with some aspects of the present invention.

FIG. 3 shows another embodiment of a FDMA communication device 300. Like FIG. 2's communication device 200, the FDMA communication device 300 includes a test switch 202 that allows the FDMA communication device 300 to selectively communicate via an antenna interface 204 or test interface 206. In this embodiment, however, the test interface 206 has a fixed test impedance 302 associated therewith, and the tuning circuit 304 has a time-varying impedance (somewhat akin to that previously discussed.) In one embodiment, the test impedance 302 could be connector with an impedance of approximately 50 ohms. As shown, the test switch is tied to a transmission and reception node 306 that the transmitter and receiver use to communicate.

If a test cable 214 is present in the test interface 206, the test switch 202 moves to position "1". This allows the RF test equipment 216 to monitor signals and perform tests on the FDMA communications device 300 through the test interface 206 using a matched 50 ohm impedance. If the sensor 208 does not detect a test cable 214, the test switch 202 is moved to position "2" and the tuning circuit 304 continuously or intermittently adjusts its impedance to match a time-varying impedance of the antenna 228.

Because FIG. 3's tuning circuit 304 no longer provides a matched impedance of approximately 50 ohms for the RF test equipment 216, in some embodiments the tuning circuit 304 can be adjusted independently of the feedback from the sensor 208. As such, FIG. 3's tuning circuit 304 may be somewhat more streamlined than FIG. 2's tuning circuit 212. However, during testing, the tuning circuit 304 is not necessarily accessible to the RF test equipment 216, which may cause some difficulties. A person of ordinary skill may balance these tradeoffs in determining which solution (or combination of these solutions) is best for their particular application.

Figure 4:
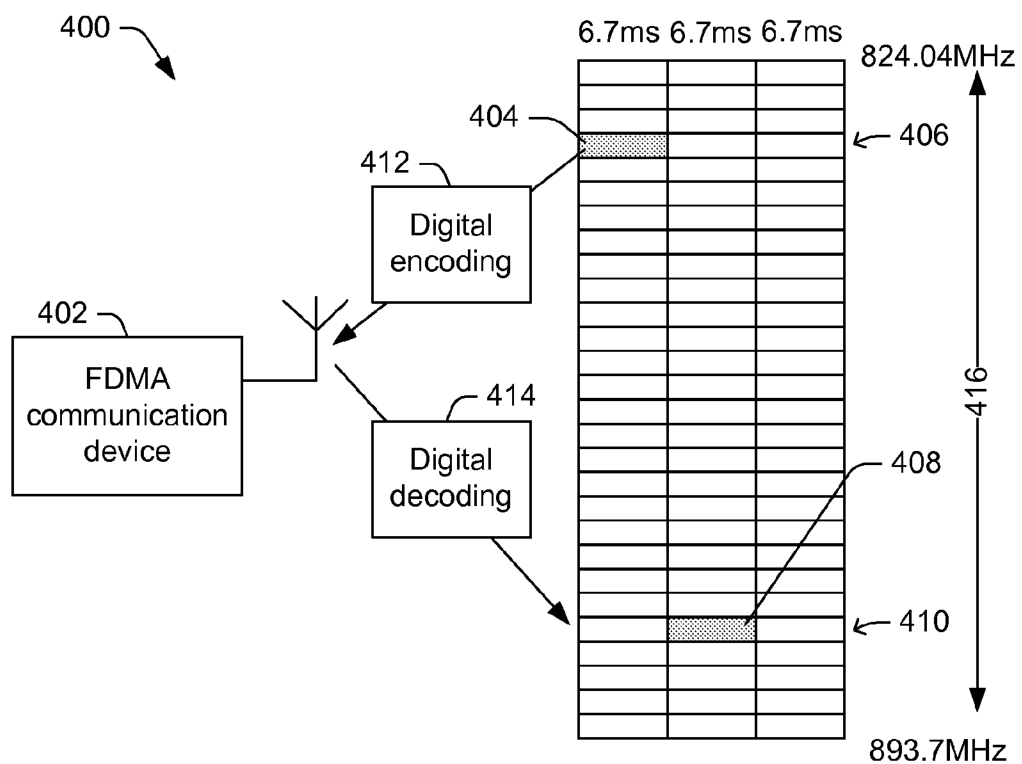
FIG. 4 shows a time division multiple access (TDMA) technology in which several TMDA RF communication devices communicate.

Referring now to FIG. 4, one can see a time domain multiple access (TDMA) access method 400. By dividing individual frequency channels into several timeslots, TDMA allows several TDMA communications devices 402 to share a single frequency channel. To establish TDMA communication, a TDMA communication device 402 requests network access during a timeslot dedicated for such requests. In the illustrated embodiment, the TDMA communication device 402 has been accepted and assigned to a first time slot 404 within a first frequency band 406 and a second time slot 408 within a second frequency band 410. In this manner, multiple TDMA communication devices accepted to the network can transmit one after another in their respective timeslots without interfering with one another. By converting the analog data (e.g., a phone conversation) into digital data using a digital encoder 412 and decoder 414, the TDMA system compresses transmitted data so it takes up significantly less transmission space than in analog format. Therefore, TDMA has a capacity that is greater than that of an analog system using the same number of frequency channels. In some embodiments, a TDMA system can operate over an available frequency range 416 at about 800 MHz (IS-54) or about 1900 MHz (IS-136), although other frequency ranges could also be used.

Figure 5:
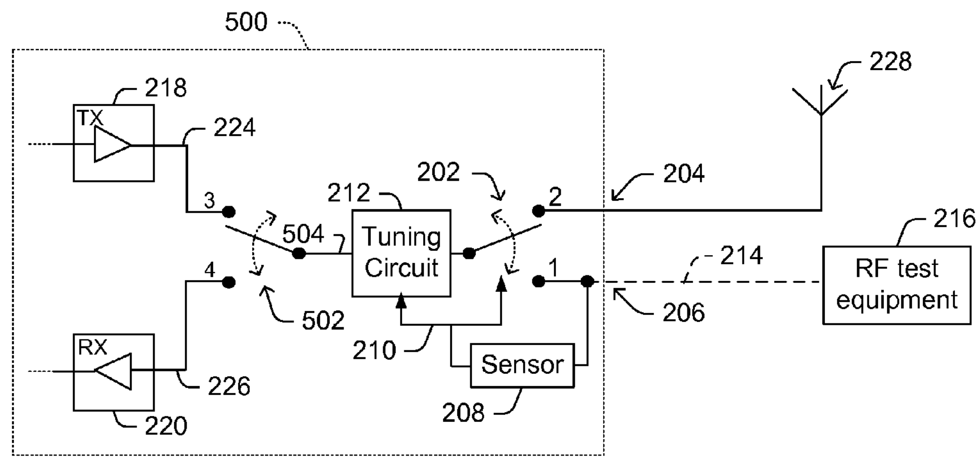
FIG. 5 shows one embodiment of a TDMA RF communication device in accordance with some aspects of the present invention.

FIG. 5 depicts an embodiment of a time domain multiple access (TDMA) communication device 500 in accordance with some aspects of the present invention. Like the previously discussed embodiments, the TDMA communication device 500 includes a test switch 202 that allows the communication device to selectively communicate via the antenna interface 204 or test interface 206. For simplicity, this figure does not show frequency tuning circuitry (e.g., filter 222 as shown in FIGS. 2-3), which could also be present in some embodiments.

If a test cable 214 is present in the test interface 206, the test switch 202 moves to position "1" so the RF test equipment 216 can perform tests on the FDMA communications device 300 while a transceiver switch 502 toggles between positions "3" and "4". To test the transmitter, the transceiver switch is set to position "3" and the transmitter 218 generates transmission test signals. The transmission test signals are passed along a transmission path 224, through the tuning circuit 212, and through the test interface 206 to the RF test equipment 216. To test the receiver 220, the transceiver switch 502 is set to position "4" and the RF test equipment 216 generates reception test signals. These reception test signals pass from the test interface 206 and through the tuning circuit 212, before passing along a reception path 226 to the receiver 220.

If the sensor 208 does not detect a test cable 214, the test switch 202 is moved to position "2" and communication device communicates using TDMA techniques. During this operational mode, the transceiver switch toggles in time between positions "3" and "4", depending on whether data is to be transmitted or received.

Figure 6:
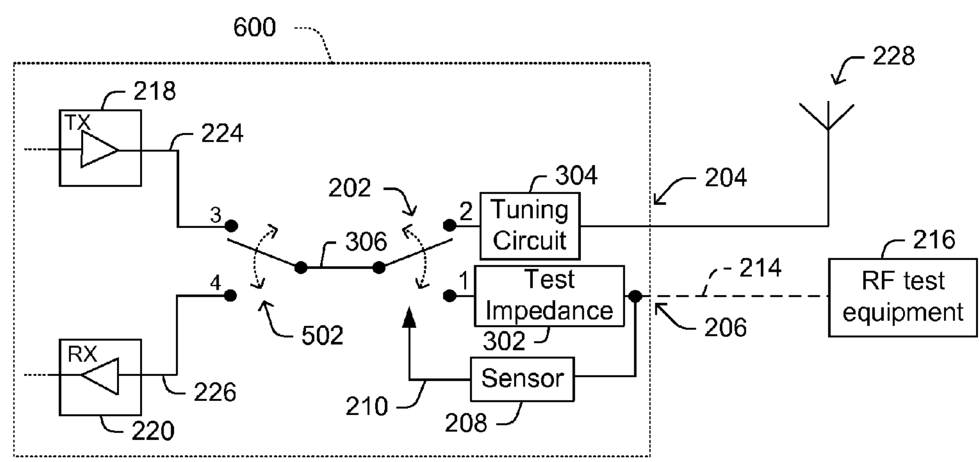
FIG. 6 shows another embodiment of a TDMA RF communication device in accordance with some aspects of the present invention.

FIG. 6 depicts another embodiment of a time domain multiple access TDMA communication device 600. In this embodiment, the test switch 202 has one terminal tied to the transmission and reception node 306, and switches between the tuning circuit 304 and the test impedance based on the feedback from the sensor 208. To facilitate switching that corresponds to a particular timeslot, the TDMA communication device 600 also includes a transceiver switch 502 as previously discussed.

Figure 7:
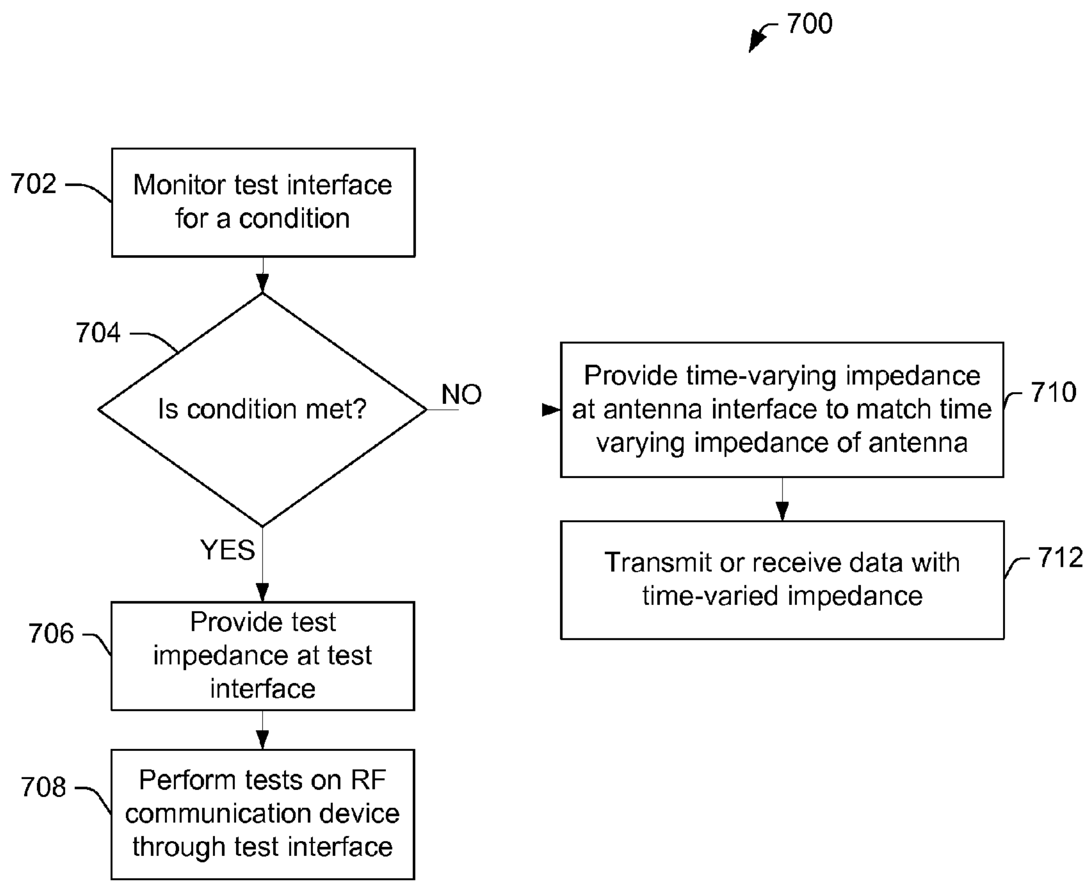
FIG. 7 is a flowchart illustrating a method of testing an RF communication device in accordance with some aspects of the present invention.

Now that some examples of systems in accordance with aspects of the invention have been discussed, reference is made to FIG. 7, which shows a method in accordance with some aspects of the invention. While this method is illustrated and described below as a series of acts or events, the present invention is not limited by the illustrated ordering of such acts or events. For example, some acts may occur in different orders and/or concurrently with other acts or events apart from those illustrated and/or described herein. In addition, not all illustrated acts may be required to implement a methodology in accordance with one or more aspects of the present invention. Further, one or more of the acts depicted herein may be carried out in one or more separate acts or phases.

At block 702, the method 700 monitors a test interface for a condition. In some embodiments the test interface could be a test interface used by standard RF test equipment, but in other embodiments other types of test interfaces could be monitored.

At block 704, the method 700 determines whether the condition is met. In one embodiment, this block could determine whether a test cable is inserted into the test interface. In one embodiment the test cable could have an impedance of approximately 50 ohms, but in other embodiments other impedances could be used. For example, 75 ohms, 100 ohms, or other values could also be used. In other embodiments, the block could determine some other condition, such as whether a wireless test is to be performed via the test interface.

If the condition is met, ("YES" at 902), the method moves to 706 where a test impedance is provided at the test interface. In one embodiment, the test impedance will be matched to the impedance of a test cable (e.g., 50 ohms).

In block 708, tests are performed on the RF communications device through the test interface. Because the test interface can be matched to the impedance of the test cable or other test interface, reflections will be limited and efficient power transmission will take place.

If the condition is not met ("NO" at 904), the method moves to 710 where a time-varying impedance is provided at an antenna interface. This time varying impedance is selected to match a time varying impedance exhibited by an antenna coupled to the antenna interface. The time varying impedance may account for impedance variations due to differences in transmission and reception, differences in frequency channels, and user interaction, among others.

In block 712, data is transmitted and/or received over the antenna using the time-varied impedance. Therefore, it will be appreciated that the method provides efficient matching, regardless of whether the RF communications device is in test mode or in operational mode.

Some methods and corresponding features of the present disclosure can be performed by hardware modules, software routines, or a combination of hardware and software. To the extent that software is employed, for example by a baseband processor or other processor associated with the radar system, the software may be provided via a "computer readable medium", which includes any medium that participates in providing instructions to the processor. Such a computer readable medium may take numerous forms, including but not limited to, non-volatile media, volatile media, and transmission media. Non-volatile media includes, for example, optical disks (such as CDs, DVDs, etc.) or magnetic disks (such as floppy disks, tapes, etc.). Volatile media includes dynamic memory, such as ferroelectric memory, SRAM, or DRAM. Transmission media includes coaxial cables, copper wire, fiber optics, etc. that could deliver the instructions over a network or between communication devices. Transmission media can also include electromagnetic waves, such as a voltage wave, light wave, or radio wave.

Although the invention has been illustrated and described with respect to one or more implementations, alterations and/or modifications may be made to the illustrated examples without departing from the spirit and scope of the appended claims. For example, although some embodiments were discussed with respect to FDMA and TDMA access methods, the invention is also applicable to other access methods, such as code division multiplexing (CDMA).

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A radio frequency (RF) communication device, comprising:

an antenna interface adapted to be coupled to an antenna that exhibits a time-varying impedance;

a test interface adapted to be coupled to RF test equipment that exhibits a test impedance; and a tuning circuit adapted to selectively provide a matched impedance to either the time-varying impedance or the test impedance based on feedback derived from the test interface.

2. The RF communication device of claim 1, further comprising:

a sensor adapted to generate the feedback based on whether a test cable associated with the RF test equipment is coupled to the test interface.

3. The RE communication device of claim 1, further comprising:

a test switch adapted to switch between a first position and a second position based on the feedback, wherein the first position the tuning circuit is coupled to the antenna interface and wherein the second position the tuning circuit is coupled to the test interface.

4. The RE communication device of claim 3, where the test switch is a mechanical switch.

5. The RF communication device of claim 1, further comprising:

a transmitter having a transmission impedance and adapted to generate transmission signals within a transmit frequency band along a transmission path;

a receiver having a reception impedance and adapted to receive reception signals within a reception frequency band along a reception path; and a filter adapted to selectively pass the transmission signals between the transmitter and the tuning circuit, and further adapted to selectively pass the reception signals between the receiver and tuning circuit.

6. The RF communication device of claim 1, further comprising:

a transmitter having a transmission impedance and adapted to generate transmission signals along a transmission path;

a receiver having a reception impedance and adapted to receive reception signals along a reception path; and a transceiver switch adapted to switch in time between a third position and a fourth position, wherein the third position the tuning circuit is coupled to the transmission path and wherein the fourth position the tuning circuit is coupled to the reception path.

7. A radio frequency (RF) communication device comprising:

an antenna interface associated with a tuning circuit that is adapted to provide a time-varying impedance that is matched to an antenna;

a test interface associated with a fixed test impedance that is matched to RF test equipment; and a test switch that selectively couples the tuning circuit or the test impedance to a transmission and reception node based on feedback derived from the test interface.

8. The RF communication device of claim 7, further comprising:

a sensor associated with the test interface and adapted to provide the feedback to the test switch.

9. The RE communication device of claim 8, where the tuning circuit adapted to provide the time-varying impedance independent of the feedback.

10. The RF communication device of claim 9, where the fixed test impedance is approximately 50 ohms.

11. The RE communication device of claim 10, further comprising:

a transmitter having a transmission impedance and adapted to generate transmission signals within a transmit frequency band along a transmission path;

a filter adapted to selectively pass the transmission signals between the transmitter and the transmission and reception node.

12. The RF communication device of claim 10, further comprising:

a receiver having a reception impedance and adapted to receive reception signals along a reception path; and a transceiver switch adapted to switch in selectively pass the reception signals between the receiver and the transmission and reception mode.

13. A method of testing a radio frequency (RF) communication device, comprising:

monitoring a test interface of the RF communication device for a condition;

providing a test impedance at the t interface while the condition is met; and providing a time-varying impedance at an antenna interface to match a time-varying impedance at an antenna if the condition is not met.

14. The method of claim 13, further comprising:

performing tests on the RF communication device through the test interface while the test impedance is provided.

15. The method of claim 14, further comprising:

transmitting or receiving data with the time-varied impedance at the antenna while the condition is not met.

16. The method of claim 15, where the test impedance is approximately 50 ohms.

17. The method of claim 16, where transmitting or receiving data comprises using at least one of: a time division multiple access technique, a frequency division multiple access technique, or a code division multiple access technique.

18. A method of testing a radio frequency (RF) communication device, comprising:

monitoring a test interface of the RF communication device to determine whether a test cable is detected; and transmitting data while providing a time-varying impedance at an antenna interface if the test cable is not detected, where the time-varying impedance of the antenna interface is matched to a time-varying impedance at an antenna coupled to the antenna interface.

19. The method of claim 18, further comprising:

receiving data after varying the time-varying impedance to account for impedance differences between a transmitter and a receiver.

20. The method of claim 18, further comprising:

performing tests on the RF communication device through the test interface while the test cable is detected.

21. The method of claim 18, where the test interface has an impedance of approximately 50 ohms.

22. A radio frequency (RF) communication device, comprising:

antenna interface means for coupling to an antenna that exhibits a time-varying impedance;

test interface means for coupling to RF test equipment that exhibits a test impedance; and tuning means for selectively providing a matched impedance to either the time-varying impedance or the test impedance based on feedback derived from the test interface means.

23. The RF communication device of claim 22, further comprising:

test switch means for switching between a first position and a second position based on the feedback, wherein the first position corresponds to a time-varying impedance at the antenna interface means and the second position corresponds to a test impedance at the test interface means.

24. The RF communication device of claim 23, further comprising:

a receiver having a reception impedance and adapted to receive reception signals within a reception frequency band along a reception path; and a filter adapted to selectively pass the reception signals between the receiver and tuning means.

25. The RF communication device of claim 23, further comprising:

a transmitter having a transmission impedance and adapted to generate transmission signals along a transmission path;

a transceiver switch adapted to selectively pass the transmission signals between the transmitter and the tuning means.

* * * * *

UNITED STATES PATENT AND TRADEMARK OFFICE

CERTIFICATE OF CORRECTION

PATENT NO. : 8,112,043 B2
APPLICATION NO. : 12/101616
DATED : February 7, 2012
INVENTOR(S) : Knudsen et al.

It is certified that error appears in the above-identified patent and that said Letters Patent is hereby corrected as shown below:

Column 7, claim 13, line 64: Please change “t” to --test--

Signed and Sealed this
Twenty-seventh Day of March, 2012

David J. Kappos
*Director of the United States Patent and Trademark Office*